(12) United States Patent
Saintes

(10) Patent No.: US 9,639,438 B2
(45) Date of Patent: May 2, 2017

(54) METHODS AND SYSTEMS OF MANAGING AN INTERCONNECTION

(71) Applicant: BULL SAS, Les Clayes Sous Bois (FR)

(72) Inventor: Maxime Saintes, Buc (FR)

(73) Assignee: BULL SAS, Les Clayes Sous Bois (FR)

( * ) Notice: Subject to any disclaimer, the term of this patent is extended or adjusted under 35 U.S.C. 154(b) by 139 days.

(21) Appl. No.: 14/737,653

(22) Filed: Jun. 12, 2015

(65) Prior Publication Data

US 2015/0378852 A1 Dec. 31, 2015

(30) Foreign Application Priority Data

Jun. 26, 2014 (FR) ...................... 14 55996

(51) Int. Cl.
*G06F 11/00* (2006.01)
*G06F 11/20* (2006.01)
(Continued)

(52) U.S. Cl.
CPC ............ *G06F 11/201* (2013.01); *G06F 11/00* (2013.01); *G06F 11/07* (2013.01);
(Continued)

(58) Field of Classification Search
CPC ...... G06F 11/201; G06F 11/00; G06F 11/004; G06F 11/006; G06F 11/008; G06F 11/07; G06F 11/0703; G06F 11/14; G06F 11/1443; G06F 11/16; G06F 11/1616; G06F 11/1625; G06F 11/1658; G06F 13/4027;
(Continued)

(56) References Cited

U.S. PATENT DOCUMENTS

| 2002/0141332 A1* | 10/2002 | Barnard ................ H04J 3/1617 370/218 |
| 2005/0204193 A1* | 9/2005 | Mannava ............ G06F 11/0745 714/18 |

(Continued)

OTHER PUBLICATIONS

R. Safranek, "Intel® QuickPath interconnect overview," 2009 IEEE Hot Chips 21 Symposium (HCS), Stanford, CA, 2009, pp. 1-27.*

(Continued)

*Primary Examiner* — Michael Maskulinski
*Assistant Examiner* — Anthony J Amoroso
(74) *Attorney, Agent, or Firm* — Sughrue Mion, PLLC

(57) ABSTRACT

A printed circuit card (1) comprising
 a first connection interface (11) configured to manage a first interconnection (10) with said card (1), said first interconnection (10) including a plurality of links;
 a second connection interface (13) configured to manage a second interconnection (20) with said card (1);
 the first connection interface (11) being further configured to detect the occurrence of a breakdown in a link of the first interconnection (10);
 the second connection interface being further configured
  to share the information of the occurrence of the breakdown;
  to select a fallback solution from among a list of fallback solutions;
  to delete the selected fallback solution once it is applied;
 the processor being further configured
  to apply the selected fallback solution to the first interconnection;
  to reinitialize the first interconnection.

9 Claims, 2 Drawing Sheets

(51) Int. Cl.
  *G06F 13/40*  (2006.01)
  *G06F 11/07*  (2006.01)
  *H04B 1/74*   (2006.01)
  H04L 12/703  (2013.01)
  H04L 12/707  (2013.01)

(52) U.S. Cl.
  CPC ........... *G06F 13/4027* (2013.01); *H04B 1/74* (2013.01); *G06F 2201/85* (2013.01); *H04L 45/22* (2013.01); *H04L 45/28* (2013.01)

(58) Field of Classification Search
  CPC ....... G06F 2201/85; H04B 1/74; H04L 45/22; H04L 45/28
  See application file for complete search history.

(56) References Cited

U.S. PATENT DOCUMENTS

| | | | | |
|---|---|---|---|---|
| 2010/0005335 A1* | 1/2010 | Ferraiolo | ............ | G06F 11/2007 714/3 |
| 2011/0231697 A1* | 9/2011 | Berke | ................... | G06F 11/004 714/3 |
| 2015/0309892 A1* | 10/2015 | Ramasubramaniam | | G06F 11/2005 714/4.5 |

OTHER PUBLICATIONS

D. Ziakas, A. Baum, R. A. Maddox and R. J. Safranek, "Intel® QuickPath Interconnect Architectural Features Supporting Scalable System Architectures," 2010 18th IEEE Symposium on High Performance Interconnects, Mountain View, CA, 2010, pp. 1-6.*

* cited by examiner

METHODS AND SYSTEMS OF MANAGING AN INTERCONNECTION

The present invention concerns the interconnections between the interfaces of connections in a computerized infrastructure.

Computerized infrastructure is understood here as being a server, a supercomputer or any other computing device comprising at least two connection interfaces (or sockets) connected between them by an interconnection. An interconnection is a physical and logical link between two connection interfaces. Generally, an interconnection comprises a plurality of links, each integrating a plurality of paths that determine the width of the link of the interconnection.

Because they are configured to meet increasing computing needs, computerized infrastructures include more and more interconnections of connection interfaces with cache coherence. It follows that the risk of a breakdown occurring in these interconnections is greater and greater. Consequently, the execution of a distributed application, or more simply the communication between the sockets of a computerized infrastructure, could frequently be in jeopardy.

Thus, in order to limit the impact of a breakdown in an interconnection on the performance of the computerized infrastructure, fallback solutions must be adopted upon detection of such a breakdown.

In this regard, it should be noted that, to date, the detection of the breakdown of an interconnection link is only made at the receiving side of said interconnection link, the part of the interconnection that sends the data to that link being unable to see said breakdown. Therefore, an appropriate mechanism is required to signal said breakdown to the emitting part of the interconnection in order to apply a suitable fallback solution in response to said breakdown.

In this respect, two approaches are distinguished.

In a first approach called "in-band," the emitting connection interface of the interconnection is informed of the occurrence of a breakdown on an interconnection link via that same interconnection. This approach has
- the advantage of not needing another dedicated communication channel (i.e. a communication channel other than the interconnection where the breakdown occurred), and
- the disadvantage of being complicated to implement and not rugged enough because it uses the interconnection where the breakdown has taken place in order to correct that breakdown.

In this instance, a QPI (Quick Path Interconnect) interconnection for an 1c) interconnection with cache coherence only allows a maximum of 8 connection interfaces to be connected.

Moreover, the fallback solutions allowed by this in-band approach are
- either the division by two or by four of the width of an interconnection link, while excluding a certain number of physical channels of that link;
- or the division by two of the frequency of a link, in addition to the width of said link.

According to a second "out-of-band" approach, it is also possible to exclude a redundant link of an interconnection, or to exclude a connection interface (socket) of said interconnection by using a communication channel other than the interconnection itself.

An object of the present invention is to propose an out-of-band solution adapted to the seriousness of the breakdown of an interconnection, while penalizing as little as possible the performance of the computerized infrastructure integrating that interconnection.

Another object of the present invention is to propose an out-of-band method making it possible to start up a server containing up to 16 interconnected sockets with cache coherence, even though a component of the interconnections of these sockets has broken down.

Another object of the present invention is to be able to exclude a socket from a computerized infrastructure such as a server.

Another object of the present invention is to propose a method of interconnection of the connection interfaces that is tolerant of breakdowns in the interconnection links.

Another object of the present invention is to improve the reliability of a computerized infrastructure while allowing quick reaction to breakdowns in its interconnections.

Another object of the present invention is to adopt fallback solutions in the interconnections of a computerized infrastructure (such as a server or a supercomputer) following the occurrence of a breakdown in an interconnection connecting two sockets of said infrastructure.

To those ends, the invention proposes, according to a first aspect, a method of managing a first interconnection between a first printed circuit card and a second printed circuit card in a computerized infrastructure, said first interconnection including a plurality of interconnection links, said first printed circuit card and said second printed circuit card being further interconnected by a second interconnection, each of the first and of the second printed circuit card including
- a first connection interface configured to manage the first interconnection;
- a second connection interface configured to manage the second interconnection;
- a processor configured to execute predefined tasks;

said method comprising the following steps
- detection of the occurrence of a breakdown in a link of the first interconnection by the first connection interface of the first printed circuit card or by the first connection interface of the second printed circuit card;
- sharing, through the second interconnection, between the first printed circuit card and the second printed circuit card of the information of occurrence of the breakdown in a link of the first interconnection;
- selection, by the second connection interface of the first printed circuit card and by the second connection interface of the second printed circuit card, of a fallback solution from among a predefined list of fallback solutions in response to said breakdown;
- application, by the processor of the first printed circuit card, of the selected fallback solution to the first interconnection;
- application, by the processor of the second printed circuit card, of the selected fallback solution to the first interconnection;
- deletion of the applied fallback solution from the predefined list of fallback solutions;
- reinitialization of the first interconnection.

According to various embodiments, the method has the following characteristics, which may be combined:
- the method comprises a step of synchronizing the step of applying the fallback solution by the processor of the first printed circuit card and the step of applying the fallback solution by the processor of the second printed circuit card.
- the predefined list of fallback solutions comprises the reduction of the width of the broken link of the first interconnection, without restarting the computerized infrastructure;

the reduction of the transfer speed of the broken link of the first interconnection, while restarting the computerized infrastructure;

the reduction of the transfer speed and of the width of the broken link of the first interconnection, while restarting the computerized infrastructure;

the exclusion of the redundant broken link, while restarting the computerized infrastructure;

the exclusion of the two first connection interfaces connected to each other by a non-redundant broken link of the first interconnection, while restarting the computerized infrastructure.

the method comprises a step of communication between the processor and the second connection interface with the same printed circuit card through a register included in the first connection interface of said printed circuit card, said printed circuit card being the first or the second printed circuit card.

the second interconnection is included in an Ethernet interconnection network.

According to a second aspect, the invention proposes a printed circuit card comprising a first connection interface configured to manage a first interconnection with said printed circuit card, said first interconnection including a plurality of interconnection links;

a second connection interface configured to manage a second interconnection with said printed circuit card;

a processor configured to execute predefined tasks;

the first connection interface being further configured to detect the occurrence of a breakdown in a link of the first interconnection;

the second connection interface being further configured to share, through the second interconnection, the information of the occurrence of the breakdown in a link of the first interconnection;

to select a fallback solution from among a predefined list of fallback solutions in response to said breakdown;

to delete the selected fallback solution once it is applied from the predefined list of fallback solutions;

the processor being further configured to apply the selected fallback solution to the first interconnection;

to reinitialize the first interconnection.

The second connection interface and the processor communicate through a register included in the first connection interface.

To reinitialize the first interconnection, the processor is further configured to wait for the second connection interface to write a predefined value in the register.

According to a third aspect, the invention proposes a computerized infrastructure comprising a first interconnection between a first printed circuit card and a second printed circuit card as presented above. The infrastructure is particularly a server or a supercomputer.

Other objects and advantages of the invention will be seen from the description of embodiments, provided below with reference to the appended drawings in which.

Figure 1:
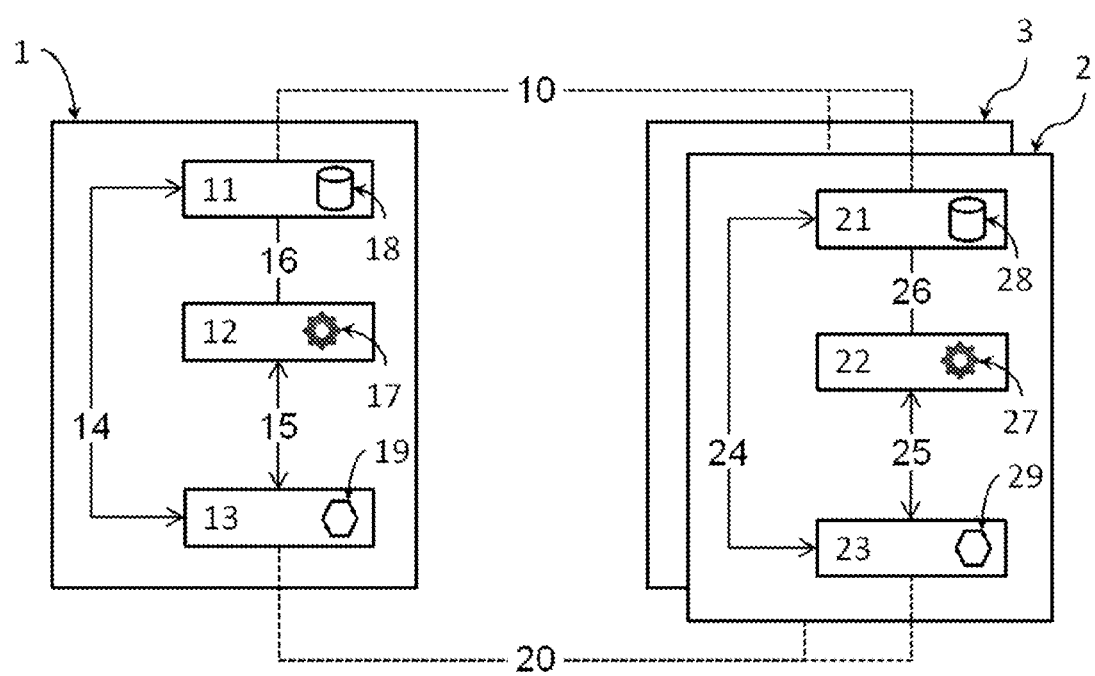
FIG. 1 illustrates a plurality of interconnected printed circuit cards in a computerized infrastructure according to one embodiment.

With reference to FIG. 1, a plurality of interconnected printed circuit cards 1-3 is shown.

The printed circuit cards 1-3 can be motherboards 1-3 included in a server, a supercomputer or any other computerized infrastructure. By way of example, the server Bullion2®, a commercially available product proposed by the applicant, can include up to eight motherboards 1-3.

A printed circuit card 1 is directly interconnected to each of the other printed circuit cards 2-3 by means of a first interconnection 10.

Said first interconnection 10 is called direct, or complete, meaning that each printed circuit card 1 has direct visibility of all other printed circuit cards 2-3 to which it is interconnected. In other words, the communication between two printed circuit cards 1-2 cannot be done by passing through another printed circuit card 3. As a result, a printed circuit card 1 has a first interconnection 10 with each of the other printed circuit cards 2-3.

In one embodiment, the first interconnection 10 is of the XQPI (eXtended QuickPath Interconnect) type, which is a commercially available interconnection solution proposed by the applicant.

Moreover, the printed circuit cards 1-3 are further connected to each other by means of a second interconnection 20. Said second connection 20 constitutes a secondary network for the implementation of an out-of-band mechanism for the management of the first interconnection 10.

In one embodiment, the second interconnection 20 is an Ethernet interconnection network connecting the printed circuit cards 1-3.

A printed circuit card 1, 2 comprises a first connection interface 11, 21 configured to manage the interactions of said printed circuit card 1, 2 through the first interconnection 10.

In one embodiment, the first connection interface 11, 21 is an electronic chip configured to manage a first interconnection 10. In the case of a first XQPI type interconnection 10, the electronic chip 11, 21 is the BCS component (Bull Coherent Switch, a commercially available solution proposed by the applicant) or any subsequent version thereof such as BCS2 (Bull Coherent Switch 2). As a result, in one embodiment, the BCS2 connection interfaces of the different printed circuit cards 1-3 are connected to each other, two by two, by means of an XQPI interconnection 10.

The first connection interface 11, 21 is provided with a register 18, 28, or more generally a memory space 18, 28, configured to write and possibly read the error(s) occurring in the first interconnection 10, as well as to synchronize the computerized programs 17, 27 and the procedures 19, 29 (presented below).

The printed circuit card 1, 2 further comprises a processor 12, 22 (or CPU—Central Processing Unit) configured to execute a computer program 17, 27. Said computer program 17, 27 is of the BIOS (Basic Input Output System) type, or more generally, of the firmware type including a plurality of tasks. Thus, the processor 12, 22 is programmed to execute specific tasks in the computer program 17, 27.

The processor 12, 22 is connected to the first connection interface 11, 21 by means of the QPI (Quick Path Interconnect) link 16, 26.

Moreover, the printed circuit card 1, 2 comprises a second connection interface 13, 23 configured to manage the second interconnection 20.

The second connection interface 13, 23 is the BMC (Baseboard Management Controller, a commercially available solution proposed by the applicant) configured to manage the Ethernet interconnection network 20.

The second connection interface 13, 23 of a printed circuit card 1, 2 communicates with the first communication interface 11, 21 and with the processor 12, 22 of the same printed circuit card 1, 2, respectively, by low data rate channels 14-15, 24-25. For example, the low data rate channels 14-15, 24-25 are I2C (Inter Integrated Circuit) buses.

The interactions of the second connection interface 13, 23 through the second interconnection 20 and through the low data rate channels 14-15, 24-25 are effected in accordance with a predefined procedure 19, 29.

By executing respectively the computer program 17 and the procedure 19, the processor 12 and the second connection interface 13 of the same printed circuit card 1 communicate by means of the local register 18.

When an error occurs on a link of the first interconnection 10, said error is written/mentioned in the register of the receiving printed circuit card for said interconnection link. For example, if the printed circuit card 2 constitutes the receiving part for the first interconnection 10, then when an error occurs in a link of said first interconnection, said error is reported in the local register 28 to the receiving printed circuit card 2.

More generally, when a breakdown occurs on the first interconnection 10 linking two printed circuit cards 1 and 2, said breakdown is reported in the register 18, 28 of the receiving printed circuit card 1, 2 of said first interconnection 10.

When a breakdown occurs in the first interconnection 10, the links of said first interconnection 10 are initialized with a fallback solution chosen by the second connection interfaces 13, 23. In other words, said links are reprogrammed with a fallback solution, and are then reinitialized. The fallback solution is chosen/selected from the following list, reduction, for example division by two, of the width of the broken link of the first interconnection 10, without restarting the computerized infrastructure;
  reduction, for example division by two, of the transfer speed of the broken link of the first interconnection 10, while restarting the computerized infrastructure;
  reduction of the transfer speed and of the width of the broken link of the first interconnection 10, while restarting the computerized infrastructure;
  exclusion of the redundant broken link, while restarting the computerized infrastructure;
  exclusion of the first connection interfaces 11, 21 connected to each other by a non-redundant broken link, while restarting the computerized infrastructure.

The fallback solution to be applied in response to a breakdown in the first interconnection 10 is preferably chosen in the increasing order of degrading of performance of the computerized infrastructure. For example, the list of fallback solutions presented above is classified in increasing order of degrading of performance of the computerized infrastructure.

For the division by two of the transfer speed, the information from the broken links of the first interconnection 10, the speed of which can be divided by two, is recorded in a memory of the second connection interface 13, 23. Said memory of the second connection interface 13, 23 is persistent through power-off/power-on cycles of the computerized infrastructure. Thus, when the computerized infrastructure undergoes a power-off/power-on cycle, the second connection interfaces 13 and 23 coordinate, respectively, with the processor 12 and the processor 22 to reconfigure, at the beginning of the initialization of said infrastructure and prior to the initialization of the first interconnection 10, the transfer speed (for example, dividing it by two) of the links of said first interconnection 10 in the first connection interfaces 11 and 21 at both ends of the first interconnection 10.

For the exclusion of a redundant link, the information from the broken redundant links that can be excluded is recorded in the memory of the second communication interface 13, 23 which is persistent through the power-on/power-off cycles of the server. Thus, when the computerized infrastructure comprising the first interconnection 10 undergoes a power-off/power-on cycle, the second connection interfaces 13, 23, at the beginning of the initialization of the computerized infrastructure and before the initialization of the first interconnection 10, indicate to the processors 12, 22 not to initiate the excluded links of the first interconnection 10.

Moreover, for the exclusion of a printed circuit card 1, 2, the information from the broken non-redundant links of the first interconnection 10 is recorded in a memory of the second connection interfaces 13, 23 which is persistent through the power-off/power-on cycles of the server. When the computerized infrastructure comprising this first interconnection 10 undergoes a power-off/power-on cycle, each of the two second connection interfaces 13, 23 of the excluded printed circuit cards 1, 2 does not start the processor 12, 22 and the first local connection interface 11, 21. At the beginning of the initialization of the computerized infrastructure and before the initialization of the first interconnection 10, the other second connection interfaces indicate to their local processors not to try to communicate with the excluded printed circuit cards. Advantageously, this action allows the computerized structure to be started irrespective of what happens, at the price, of course, of reduced performance.

When a breakdown occurs on a link of the first interconnection 10, the processor 22 and the second connection interface 23 of the receiving printed circuit card 2 for said link of the first interconnection 10 execute a distributed algorithm to apply a fallback solution. Said distributed algorithm results in the combined execution of the computer program 27 by the processor 22 and of the procedure 29 by the second connection interface 23. Advantageously, by having a persistent memory through the power-off/power-on cycles, the second connection interface 23 is capable of choosing a fallback solution following a breakdown in the first interconnection 10.

The processor 22 and the second connection interface 23 are combined in the sense that their work (i.e. the execution, respectively, of the computer program 27 and the procedure 29) is simultaneous and contributes to a common end, namely the initialization of the first interconnection 10, with the appropriate fallback solution in response to the detected breakdown.

For the execution of the distributed algorithm, the processor 22 and the second connection interface 23 of the same printed circuit card 2 communicate by performing reads and writes in the register 28 of said printed circuit card 2.

When a breakdown occurs in the first interconnection 10, the distributed algorithm makes it possible
  to share, through the second interconnection 20 (which constitutes a secondary network for the implementation of an out-of-band mechanism for managing the first interconnection 10), the information of the occurrence of said breakdown;

to select from the list of fallback solutions the one that least degrades the performance of the computerized infrastructure;

to apply said fallback solution;

to delete said solution from the list of possible fallback solutions; and to reinitialize the first interconnection 10.

For the initialization of the first interconnection 10, each of the two first connection interfaces 11, 21 is controlled by the processor 12, 22 in accordance with the computer program 17, 27. Said control is performed through the QPI link 16, 26 which connects the processor 12, 22 to the respective first connection interface 11, 21; and by the second connection interface 13, 23, in accordance with the procedure 19, 29. Said control is performed through the low data rate channel 14, 24.

To simplify the presentation of said distributed algorithm, with reference to FIG. 2, the printed circuit card 2 is considered hereinafter as being the receiving printed circuit card in the first interconnection 10. The printed circuit card 1 is considered as being the emitting part in said first interconnection 10. Therefore, when an error occurs in said first interconnection 10, said error is noted in the register 28 of the printed circuit card 2.

In a first synchronization step (E0 in FIG. 2), the processor 12 waits for the second local connection interface 13 to write a predefined value in the local register 18 (for example, placing the value one in the register 18). The purpose of this step is for the computer programs 17 and 27 of the printed circuit cards 1 and 2 interconnected by the first interconnection 10 to arrive at a synchronization point. Indeed, by being in communication through the second connection interface 20, the second connection interfaces 13 and 23 lead the two processors 17 and 27 to a synchronization point based on the values that they write in, respectively, the register 18 and the register 28.

Each of the two processes 12 and 22 then prepares the initialization (step E1 in FIG. 2) of the local links of the first interconnection 10 in accordance with the instructions from the respective computer programs 17 and 27.

Subsequently, the initialization of the local links of the first interconnection 10 is performed (step E2 in FIG. 2) by executing, via the processors 12 and 22, respectively, instructions from the computer programs 17 and 27.

In other words, the processor 12, 22 of each printed circuit card 1, 2 tries to initialize (step E2 in FIG. 2) the local links of the first interconnection 10. Thus, upon completion of the step E2 and when a breakdown occurs on the first interconnection 10, the value of the register 28 of the receiving printed circuit card 2 is equal to a value indicating the presence of a breakdown.

Following the initialization step E2, the processor 12, 22 of each printed circuit card 1, 2 reads the local register 18, 28 of the links of the first interconnection 10 (step E3 in FIG. 2) to see if any links are broken down.

Thus, depending on the value read from the register (test T0 executed locally by the processor), two results are possible in the distributed algorithm.

If no error is detected locally (each processor being aware only of errors that are local to its printed circuit card) in the links of the first interconnection 10, the initialization of said links is considered to be successful and is terminated (step E9), on the condition that the selected fallback solution is already applied (test T5). If the selected fallback solution is going to be applied for the first time (Test T5), then a return to step E4 (which will be presented below) is performed.

In the presence of a broken link of the first local interconnection 10 and a printed circuit card 1, 2 (value of the local register being equal to one), the respective processor 12, 22 verifies (test T1 in FIG. 2) that the selected fallback solution has not already been applied (step E7 in FIG. 2) to said broken link of the first interconnection 10 (for example, verifying that the division by two of the width of the link of the first interconnection 10 has not already been applied to it).

In other words, the test T1 makes it possible to verify whether the chosen fallback solution will be applied for the first time to the broken link of the first interconnection 10.

If so, i.e. the chosen fallback solution has not already been applied to the broken link of the first interconnection, then the local processor 12, 22 verifies (test T3 in FIG. 2) that the application of the chosen fallback solution to said link is authorized.

If the application of the chosen fallback solution is authorized, then the processor 12, 22 transmits (step E4 in FIG. 2) the information from the failed links (particularly, the value of the registers) to the second local connection interface 13, 23.

In the next step E5, each of the second connection interfaces 13, 23 summarizes the status of the links of the first interconnection 10 and transmits said summary to the local processor 12, 22. To do this, the second connection interfaces communicate between one another the value of the registers 18, 28 of their respective printed circuit card through the second interconnection interface 20 (thus, when a breakdown occurs, the register 18 of the emitting printed circuit card 1 receives the same value indicating the presence of an error by means of the second connection interface 13);

summarizes the errors and transmits the summary to their local processor through the local register.

In other words, the second connection interfaces 13 and 23 share (step E5), through the second interconnection 20, any occurrence of breakdown in the first interconnection 10.

Advantageously, the summary of errors transmitted to the processors 12, 22 enables each of the processors 12, 22 to know the errors viewed at the other end of their local links.

A test T4, performed by the second connection interfaces 13 and 23, verifies that no link of the first interconnection 10 is broken down (i.e., verifies globally that there is no error). If that is the case, then the initialization of the links of the first interconnections 10 is considered to be successful (step E9 in FIG. 2).

Otherwise, i.e. in the presence of a broken link of the first interconnection 10, a new synchronization step (E6 in FIG. 2) in which each of the processors 12, 22 is placed on standby at a synchronization point with the second local connection interface 13, 23 of its printed circuit card 1, 2 through the local register 28. Indeed, the processor 12, 22 waits for the second local connection interface 23 to write in the local register 28 a particular value marking the synchronization point (for example the value four).

Figure 2:
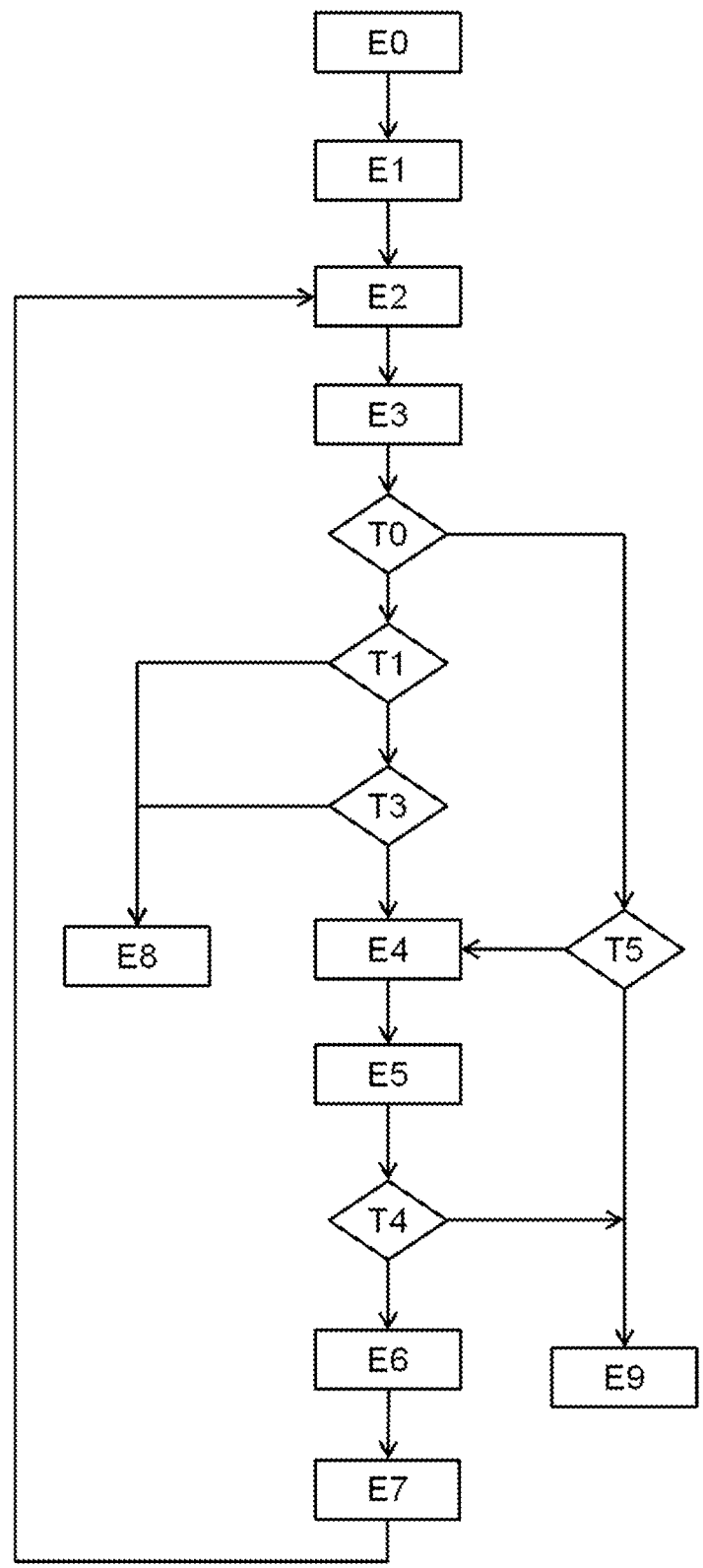
FIG. 2 illustrates steps of a distributed algorithm to be executed by entities of printed circuit cards, following a breakdown in an interconnection according to one embodiment.

As soon as the local register 18, 28 has the value of four, the chosen fallback solution is applied (step E7 in FIG. 2). In other words, after a synchronization step (E6 in FIG. 2), each of the processors 12, 22 reprograms (step E7 in FIG. 2) the links of the first interconnection 10 in which it has seen an error or for which the second local connection interface 13, 23 has signaled an error to it.

As indicated in FIG. 2, the end of this step E7 returns to the initialization step E2. The initialization resumes without being able to reapply the same fallback solution that has just been applied. In other words, in the presence of an error, the initialization of the links of the first interconnection fails and is terminated because the fallback solution has already been performed (test T1) in step E7, resulting in step E8 indicating the stopping of the procedure to initialize the links of the first interconnection 10. Moreover, when the chosen fallback solution is not authorized, said step E8 is also called.

Advantageously, the communication of the information necessary for the algorithm between two sides of a link of the first interconnection 10 is accomplished by an out-of-band mechanism, implementing the second interconnection 20. Said second interconnection 20, in this instance an Ethernet interconnection of the second connection interfaces 13 and 23, constitutes a communication channel other than the first interconnection 10 of the first connection interfaces 11 and 21. Advantageously, said mechanism is simpler and more rugged than an in-band mechanism going through the first interconnection 10 of the first connection interfaces 11 and 21.

Advantageously, the different embodiments presented above enable communication between two distributed processes in spite of the occurrence of a breakdown at their interconnection.

Advantageously, when a breakdown is detected on a link of the first interconnection 10 and is mentioned in the register 18, 28, the distributed algorithm described above enables the first interconnection 10 to be initialized in spite of the breakdown found there.

The invention claimed is:

1. A method of managing a first interconnection between a first printed circuit card and a second printed circuit card in a computerized infrastructure, said first interconnection including a plurality of interconnection links, said first printed circuit card and said second printed circuit card being further interconnected by a second interconnection, each of the first and of the second printed circuit card including
   a first connection interface configured to manage the first interconnection;
   a second connection interface configured to manage the second interconnection;
   a processor configured to execute predefined tasks;
said method comprising the following steps
   detection of the occurrence of a breakdown in a link of the first interconnection by the first connection interface of the first printed circuit card or by the first connection interface of the second printed circuit card;
   sharing, through the second interconnection [sic], between the first printed circuit card and the second printed circuit card of the information of occurrence of the breakdown in a link of the first interconnection;
   selection, by the second connection interface of the first printed circuit card and by the second connection interface of the second printed circuit card, of a fallback solution from among a predefined list of fallback solutions in response to said breakdown;
   application, by the processor of the first printed circuit card, of the selected fallback solution to the first interconnection;
   application, by the processor of the second printed circuit card [sic], of the selected fallback solution to the first interconnection;
   deletion of the applied fallback solution from the predefined list of fallback solutions;
   reinitialization of the first interconnection.

2. The method according to claim 1, further comprising a step of synchronizing the step of applying the fallback solution by the processor of the first printed circuit card and the step of applying the fallback solution by the processor of the second printed circuit card.

3. The method according to claim 1, wherein the predefined list of fallback solutions comprises
   the reduction of the width of the broken link of the first interconnection, without restarting the computerized infrastructure;
   the reduction of the transfer speed of the broken link of the first interconnection, while restarting the computerized infrastructure;
   the reduction of the transfer speed and of the width of the broken link of the first interconnection, while restarting the computerized infrastructure;
   the exclusion of the redundant broken link, while restarting the computerized infrastructure;
   the exclusion of the two first connection interfaces connected to each other by a non-redundant broken link of the first interconnection, while restarting the computerized infrastructure.

4. The method according to claim 1, further comprising a step of communication between the processor and the second connection interface with the same printed circuit card through a register included in the first connection interface of said printed circuit card, said printed circuit card being the first or the second printed circuit card.

5. The method according to claim 1, wherein the second interconnection is included in an Ethernet interconnection network.

6. A printed circuit card comprising
   a first connection interface configured to manage a first interconnection with said printed circuit card, said first interconnection including a plurality of interconnection links;
   a second connection interface configured to manage a second interconnection with said printed circuit card;
   a processor configured to execute predefined tasks;
   the first connection interface being further configured to detect the occurrence of a breakdown in a link of the first interconnection;
   the second connection interface being further configured
      to share, through the second interconnection, the information of the occurrence of the breakdown in a link of the first connection;
      to select a fallback solution from among a predefined list of fallback solutions in response to said breakdown;
      to delete the selected fallback solution once it is applied from the predefined list of fallback solutions;
   the processor being further configured
      to apply the selected fallback solution to the first interconnection;
      to reinitialize the first interconnection.

7. The printed circuit card according to claim 6, wherein the second connection interface and the processor communicate through a register included in the first connection interface.

8. The printed circuit card according to claim 7, wherein, in order to reinitialize the first interconnection, the processor is configured to wait for the second connection interface to write a predefined value in the register.

9. A computerized infrastructure comprising a first interconnection between a first printed circuit card and a second printed circuit card according to claim 6.

* * * * *